Nov. 20, 1945.   D. P. FAULK   2,389,351
ELECTRONIC FULL CYCLE TIMING CONTROL
Filed Oct. 30, 1942
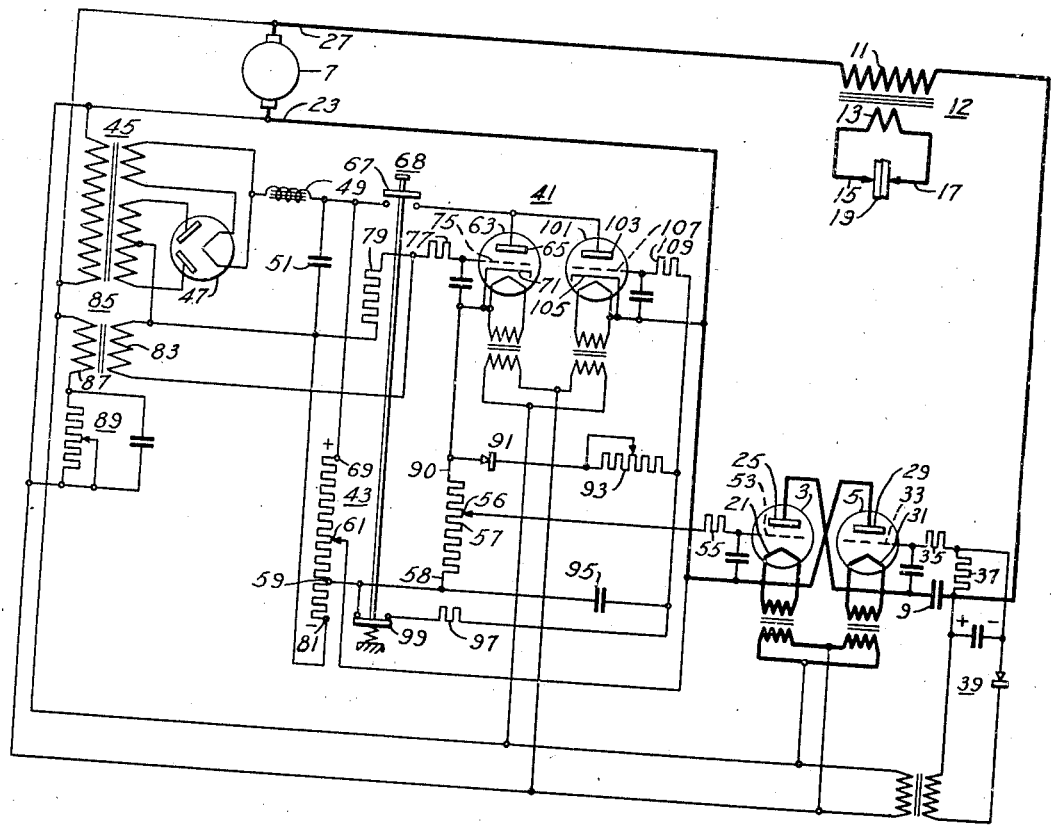
WITNESSES:
INVENTOR
Donald P. Faulk.
BY
ATTORNEY Patented Nov. 20, 1945

2,389,351

UNITED STATES PATENT OFFICE 2,389,351

ELECTRONIC FULL CYCLE TIMING CONTROL

Donald P. Faulk, Pittsburgh, Pa., assignor to Westinghouse Electric Corporation, East Pittsburgh, Pa., a corporation of Pennsylvania Application October 30, 1942, Serial No. 463,988

6 Claims. (Cl. 250—27)

This invention relates to an electronic timing control system and has particular relation to a system for controlling an alternating current circuit in such manner that only complete cycles of alternating current are conducted therethrough.

In many electronic control systems for use with an alternating current circuit, it is desirable to employ what is commonly known as a follow-up circuit. For example, a follow-up circuit is often employed in spot welding systems. In such systems, a pair of electric discharge valves of the arc-like type are connected in anti-parallel between an alternating current source and the welding transformer. Timing means are arranged to render one of the valves conductive in each half cycle of one polarity of the source throughout an interval of time of a selected length and a follow-up circuit is provided to cause the second valve to become conductive in the half-cycle of opposite polarity following each half-cycle of the one polarity in which the first valve is conductive. The follow-up circuit thus makes it certain that only complete cycles of alternating current are supplied to the welding transformer although the number of complete cycles supplied may be varied at will. If the second valve were also controlled by the timing system, an error in timing or an inadvertent setting of the system might result in an odd number of half-cycles of current being supplied. The supply of an odd number of half-cycles of current in each of a series of welding operations would result in saturation of the welding transformer unless additional means were provided to avoid such saturation.

Follow-up circuits are particularly advantageous if the anti-parallel connected valves are used to control a series capacitor circuit. In the well known series capacitor circuit, a capacitor is connected in series with the load and the circuit is tuned substantially to resonance. Then as the first valve is conductive, the capacitor is charged in one direction and when the second valve is conductive, the capacitor is discharged and charged in the opposite direction. In such a circuit, if an odd number of half-cycles of current is supplied so that the first valve is conductive last and another operation is initiated immediately thereafter, the first valve should again become conductive with the usual timing system but a defective operation results because the capacitor is already charged in the direction resulting from conduction of the first valve.

Various follow-up circuits have been employed in the past. Some of these include a number of electronic tubes and their associated circuits while others employ an auxiliary transformer, the primary of which is connected across the primary of the welding transformer, to supply a potential to render the second valve conductive. The tubes and circuits are rather expensive while the auxiliary transformer is not entirely satisfactory under certain power factor conditions.

It is an object of my invention to provide a new and improved follow-up circuit.

Another object of my invention is to provide a new and simplified follow-up circuit employing a minimum of parts.

A further object of my invention is to provide a novel and inexpensive electronic system for controlling the supply of current from an alternating current source to a load in which only complete cycles of current is supplied.

A still further object of my invention is to provide a novel electronic system for controlling the supply of current in a series capacitor load circuit from an alternating current source in which only complete cycles of current is supplied.

In accordance with my invention, a pair of electric discharge valves are connected in anti-parallel between an alternating current source and a load. Timing means are provided to render one of the valves conductive in each half cycle of one polarity throughout a preselected time interval. In addition, a capacitor is connected in series with the source, valves and load. This capacitor is also connected in a control circuit for the second valve and means are provided for impressing a biasing potential in the control circuit to maintain the second valve normally non-conductive. When the first valve is conductive during a half cycle of a first polarity, the current flowing therethrough simultaneously charges the capacitor and energizes the load. The potential charge thus placed on the capacitor is of such magnitude and polarity that the biasing potential is counteracted and the second valve is rendered conductive in the following half cycle of the source. When the second valve becomes conductive, the load remains energized and the capacitor is discharged through the second valve and charged in the opposite direction. Thereafter, the first valve is again rendered conductive in a half cycle of the first polarity to again charge the capacitor to a potential sufficient to render the second valve conductive. Thus each time the first valve is rendered conductive in one half cycle of the source, the second valve becomes conductive in the following half cycle.

If desired the elements of the load circuit may be tuned to resonance. However, the follow-up circuit operates as desired whether the load circuit is tuned or not.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing, the single figure of which is a diagrammatic view showing my invention as embodied in a welding apparatus.

As illustrated in the drawing, a pair of electric discharge valves 3 and 5 of the arc-like type are interposed in a series circuit including an alternating current source 7, a capacitor 9 and the primary 11 of a welding transformer 12. The secondary 13 of the welding transformer 12 is connected across the welding electrodes 15 and 17 which are in engagement with the material 19 to be welded. The valves 3 and 5 are connected in anti-parallel with each other so that the cathode 21 of valve 3 is connected to one side 23 of the source 7 and its anode 25 is connected through the capacitor 9 and the primary 11 to the other side 27 of the source. The anode 29 of the second valve 5 is connected to one side 23 of the source and its cathode 31 is connected through capacitor 9 and the primary 11 to the other side 27 of the source. Thus the valve 3 may conduct current in half cycles of one polarity and valve 5 may conduct current in half cycles of the opposite polarity.

The control circuit of the second valve 5 extends from the grid 33 thereof through a grid resistor 35, another resistor 37 and the capacitor 9 to the cathode 31 of the valve. A source of direct current potential 39 is employed to impress a biasing potential across the resistor 37 to maintain the second valve 5 normally non-conductive.

A timing circuit 41 is provided to control the operation of the first valve 3. The timing circuit includes a voltage divider 43 energized from the source 7 through an auxiliary transformer 45, a full-wave rectifier 47 and filtering elements 49 and 51. The control circuit of the first valve 3 may then be traced from the grid 53 thereof through a grid resistor 55 and intermediate tap 56 on another resistor 57 and the lower end 58 of resistor 57 to intermediate tap 59 on the divider 43. The control circuit continues from another intermediate tap 61 on the divider 43, which is more positive than tap 59, to the cathode 21 so that cathode 21 is normally positive with respect to the grid 53 to maintain the first valve 3 non-conductive.

Another electric discharge valve 63 of the arc-like type, preferably a thyratron, has its anode 65 connected through the open contactor 67 of a push-button switch 68 to the positive terminal 69 of the divider 43. The cathode 71 of valve 63 is connected to the intermediate tap 59 of the divider 43 through the resistor 57. This valve 63 is designated hereinafter as the "start" valve. The control circuit of the start valve 63 may be traced from the grid 75 thereof through a grid resistor 77 and a resistor 79 to the negative terminal 81 of the divider and from intermediate tap 59 through resistor 57 to the cathode. The portion 81—59 of divider 43 impresses a biasing potential in the control circuit of the start valve 63 tending to maintain the start valve non-conductive. The secondary 83 of an impulse transformer 85 is connected across the resistor 79 in the control circuit of the start valve 63. The primary 87 of the impulse transformer 85 is energized from the alternating current source 7 through a phase shifting circuit 89. The phase shifting circuit 89 is adjusted according to the power factor of the load so that a potential impulse of such polarity and magnitude as to render the start valve 63 conductive is impressed across the resistor 79 at the beginning of each half cycle of current in which the anode 25 of the first valve 3 is positive.

When the start valve 63 becomes conductive, the upper end 90 of the resistor 57 is connected therethrough to the positive terminal 69 of the divider 43. Intermediate tap 56 on resistor 57 is then positive relative to tap 61 on divider 43. Thus the grid 53 is positive with respect to the cathode 21 and the first valve 3 conducts current during each half cycle of the source in which its anode 25 is positive as long as this condition exists.

The cathode 71 of the start valve 63 is also connected to the intermediate tap 59 on the divider 43 in a circuit which extends from the cathode 71 through a rectifier 91, an adjustable resistor 93 and a capacitor 95. The capacitor 95 is originally in a discharged state because of the discharge circuit therefor through a resistor 97 and a back contactor 99 on the push-button switch 68. When the push-button switch 68 is actuated, the anode circuit of the start valve 63 is closed and the start valve is thereafter rendered conductive. The discharge circuit for capacitor 95 is opened and current flowing through the start valve charges the capacitor 95 at a rate determined by the setting of the adjustable resistor 93.

Another electric discharge valve 101 of the arc-like type, which is hereinafter designated as a stop valve also has its anode 103 connected to the positive terminal 69 of the divider 43 through contactor 67 of the push-button switch 68. The cathode 105 of the stop valve 101 is connected to the intermediate tap 61 of the divider 43. The grid 107 is connected through a grid resistor 109 and the capacitor 95 to the intermediate tap 59 of the divider 43 so that the stop valve 101 is normally non-conductive. However, after the start valve 63 has been conductive for a preselected interval of time determined by the setting of the adjustable resistor 93, the potential on the capacitor 95 causes the grid 107 of the stop valve 101 to become positive with respect to its cathode 105 and the stop valve becomes conductive. When the stop valve 101 becomes conductive, the cathode 21 of the first valve 3 is connected therethrough to the positive terminal 69 of the divider 43. Therefore, the grid 53 of the first valve 3 is again negative with respect to its cathode 21 so that the first valve does not become conductive in the next half cycle in which its anode is positive.

To initiate a welding operation the push-button switch 68 is actuated whereupon the start valve 63 becomes conductive at the beginning of the next half-cycle of the source in which the anode 25 of the first valve 3 is positive. The first valve 3 is then rendered conductive in alternate half cycles of the source for a preselected time interval determined by the setting of the adjustable resistor 93.

As the first valve becomes conductive, current flows therethrough to energize the welding transformer 12. The current flowing through the first valve 3 also flows through the capacitor 9 to charge it in such a direction that the plate of the capacitor connected to the cathode 31 of the second valve 5 is negative. At the beginning of the next half cycle of the source, the anode 29 of the second valve 5 becomes positive. The potential charge then on the capacitor 9 is sufficient to counteract the biasing potential across the resistor 37 so that the second valve 5 becomes conductive. When the second valve 5 becomes conductive, the current flow therethrough continues to energize the welding transformer 12. It is also apparent that the capacitor 9 discharges through the second valve 5 and is charged in the opposite direction. At the beginning of the third half cycle of the source, the first valve 3 is again rendered conductive and the alternate operation of the first and second valves continues until the stop valve 101 in the timing circuit becomes conductive. When the stop valve 101 becomes conductive, the grid 53 of the first valve 3 becomes negative with respect to its cathode 21 so that the first valve is prevented from becoming conductive in the next half cycle in which its anode is positive and welding operation is halted. It is to be noted that throughout the welding operation, the second valve always becomes conductive in the next half cycle or half period of the source following conduction of the first valve.

Another welding operation may be effected by releasing the push-button switch 68 and thereafter reoperating it.

Although I have shown and described a preferred embodiment of my invention, I am fully aware that many modifications thereof are possible without departing from the spirit of the invention. My invention, therefore, is not to be restricted to the specific embodiment disclosed.

I claim as my invention:

1. For use in supplying power from an alternating current source to an inductive load, the combination comprising a pair of electric discharge valves of the arc-like type connected in anti-parallel between said source and load, means for rendering one of said valves conductive in a half period of said source, a capacitor connected in series with said source and load and said one valve to be charged by current flowing through said one valve and means operable in response to the potential across said capacitor after charging thereof to render the other of said valves conductive in the following half-period.

2. For use in supplying power from an alternating current source to an inductive load, the combination comprising a pair of electric discharge valves of the arc-like type connected in anti-parallel between said source and load, a capacitor connected in a series circuit with said source, valves and load, the capacitor and load being so related that the series circuit is substantially tuned to resonance, means for rendering one of said valves conductive in a half-period of said source, and means operable in response to the potential charge across said capacitor stored by the current flowing through said one valve to render the other of said valves conductive in the following half-period.

3. For use in supplying power from an alternating current source to an inductive load, the combination comprising a pair of electric discharge valves of the arc-like type connected in anti-parallel between said source and load, a capacitor connected in a series circuit with said valves, load and source, means for connecting said capacitor in a control circuit for one of said valves, means for impressing a biasing potential in said control circuit for normally maintaining said one valve non-conductive, and means for rendering the other of said valves conductive in a half-period of said source, said capacitor being charged by the current flowing therethrough while said other valve is conductive to a potential sufficient to counteract said biasing potential and render said one valve conductive in the following half-period.

4. For use in supplying power from an alternating current source to an inductive load, the combination comprising a pair of electric discharge valves of the arc-like type connected in anti-parallel between said source and load, a capacitor connected in a series circuit with said valves, load and source, the capacitor and load being so related that the series circuit is substantially tuned to resonance, means for connecting said capacitor in a control circuit for one of said valves, means for impressing a biasing potential in said control circuit for normally maintaining said one valve non-conductive, and means for rendering the other of said valves conductive in a half-period of said source, said capacitor being charged by the current flowing therethrough while said other valve is conductive to a potential sufficient to counteract said biasing potential and render said one valve conductive in the following half-period.

5. For use in supplying power from an alternating current source to an inductive load, the combination comprising a pair of electric discharge valves of the arc-like type, each of said valves having an anode and a cathode connected in a series circuit with said source and load and also having a control electrode, the anode and cathode of one valve being in anti-parallel with the anode and cathode of the other valve, a capacitor connected in series with the anodes and cathodes of said valves and said source and load, a circuit extending between the control electrode of said one valve and the terminal of said capacitor remote from the cathode of said one valve, means for impressing a biasing potential in said circuit to maintain said one valve normally non-conductive, and means for impressing a potential between the control electrode and cathode of the other valve to render it conductive in a half period of said source, said capacitor being charged by the current flowing therethrough while said other valve is conductive to a potential sufficient to counteract said biasing potential and render said one valve conductive in the following half period.

6. For use in supplying power from an alternating current source to an inductive load, the combination comprising a pair of electric discharge valves of the arc-like type connected in anti-parallel between said source and load, each of said valves having a plurality of principal electrodes and a control electrode, a capacitor connected in series with the principal electrodes of said valves and said source and load, a control circuit extending between the control electrode and one of the principal electrodes of one of said valves and including said capacitor, means for impressing a biasing potential in said control circuit to maintain said one valve normally non-conductive, and timing means for impressing a potential between the control electrode and one of the principal electrodes of the other valve to render said other valve conductive in each half-period of one polarity of said source throughout a preselected time interval, said capacitor being charged by the current flowing therethrough each time said other valve is conductive to a potential sufficient to counteract said biasing potential and render said one valve conductive in the following half period of opposite polarity.

DONALD P. FAULK.